United States Patent
Cawlfield et al.

(10) Patent No.: US 10,836,636 B2
(45) Date of Patent: Nov. 17, 2020

(54) SODIUM HYPOCHLORITE COMPOSITIONS

(71) Applicant: Olin Corporation, Clayton, MO (US)

(72) Inventors: David W. Cawlfield, Clayton, MO (US); Randall Taylor Morris, Clayton, MO (US); Richard Carl Ness, Clayton, MO (US); Leonard L. Scott, Clayton, IL (US); Sanders Harrison Moore, Clayton, MO (US); Awuri Priye Asuru, Clayton, MO (US)

(73) Assignee: OLIN CORPORATION, St. Louis, MO (US)

( * ) Notice: Subject to any disclaimer, the term of this patent is extended or adjusted under 35 U.S.C. 154(b) by 22 days.

(21) Appl. No.: 15/580,360

(22) PCT Filed: Jun. 13, 2016

(86) PCT No.: PCT/US2016/037136
§ 371 (c)(1),
(2) Date: Dec. 7, 2017

(87) PCT Pub. No.: WO2016/201397
PCT Pub. Date: Dec. 15, 2016

(65) Prior Publication Data
US 2018/0141808 A1    May 24, 2018

Related U.S. Application Data

(60) Provisional application No. 62/173,686, filed on Jun. 10, 2015.

(51) Int. Cl.
*C01B 11/06* (2006.01)

(52) U.S. Cl.
CPC .......... *C01B 11/062* (2013.01); *C01B 11/068* (2013.01); *C01P 2004/54* (2013.01); *C01P 2004/60* (2013.01); *C01P 2006/22* (2013.01)

(58) Field of Classification Search
CPC ............................ C01B 11/062; C01B 11/068
See application file for complete search history.

(56) References Cited

U.S. PATENT DOCUMENTS

| | | | | |
|---|---|---|---|---|
| 5,194,238 A | * | 3/1993 | Duncan | C01B 11/062 252/187.25 |
| 2014/0117278 A1 | * | 5/2014 | Cawlfield | C01B 11/062 252/186.21 |

* cited by examiner

*Primary Examiner* — Ngoc-Yen Nguyen
(74) *Attorney, Agent, or Firm* — Polsinelli PC

(57) ABSTRACT

The present invention provides compositions comprising comminuted sodium hypochlorite pentahydrate crystals with an average length-to-diameter ratio of less than about 20:1, and a mother liquor saturated in sodium hypochlorite, which has excess alkalinity and/or one or more additional alkali or alkali earth metal salts. Processes for preparing these compositions will be presented.

19 Claims, No Drawings

SODIUM HYPOCHLORITE COMPOSITIONS

FIELD OF THE INVENTION

The present disclosure relates to aqueous sodium hypochlorite compositions, and processes for preparing these compositions.

BACKGROUND OF THE INVENTION

Sodium hypochlorite, commonly known as bleach, has many uses including industrial, utility, and residential applications. In many large-scale applications, sodium hypochlorite has traditionally been produced on-site by combining chlorine, alkali, and water. Chlorine is conventionally provided as liquefied chlorine gas in portable cylinders or in railcars. However, certain risks and costs are associated with the handling, shipping, and storage of liquefied chlorine. An alternative to handling liquefied chlorine is to produce the chlorine or sodium hypochlorite by electrolysis. Direct electrolysis is described in prior art as the conversion of sodium chloride-containing brine to a solution containing of sodium hypochlorite in an undivided electrochemical cell. This process has the advantage of producing sodium hypochlorite without the transport of gaseous chlorine and solutions containing caustic soda. The principal disadvantage of on-site direct electrolysis to make bleach is that high conversion of salt to bleach is not achievable simultaneously with high energy efficiency. Other problem encountered with direct electrolysis is the limited life of electrodes used in the electrolysis and the undesirable formation of chlorate, either by thermal decomposition of hypochlorite solutions or by the electro-oxidation of hypochlorite at the anode.

Another alternative process for the production of sodium hypochlorite is indirect. This process begins with electrolysis of salt to produce chlorine and caustic soda, which are later recombined chemically to produce bleach. Indirect electrolysis is typically performed in a membrane-cell electrolyzer, and can achieve high conversion of salt and high energy efficiency. The chlorine and caustic soda co-produced by this means can be combined in a suitable reactor to produce bleach solutions. However, the indirect production of bleach requires substantial investment in equipment, as well as equipment for safely handling gaseous chlorine. The indirect production of bleach is thus unsuitable for many on-site applications at the point of use. Such production is typically optimized based upon proximity to electric power supply and salt availability, so it is typically uneconomic to produce bleach by indirect electrolysis at many locations where it is needed.

Sodium hypochlorite has been synthesized as described above and shipped to end customers. Yet, these solutions have had limited success primarily due to the instability of sodium hypochlorite solutions. Decomposition of the sodium hypochlorite yields solutions of sodium hypochlorite with reduced concentrations.

Sodium hypochlorite compositions made exclusively of sodium hypochlorite pentahydrate crystals in their naturally formed state have an undesirably low bulk density. This low bulk density is attributed to randomly-oriented needle-shaped crystals of sodium hypochlorite pentahydrate that do not pack tightly together. These sodium hypochlorite crystals are also subject to rapid decomposition when allowed to come in contact with air forming a dilute solution containing some bleach and salt, even when low storage temperatures are maintained. Without being bound to any theory, it is thought that the decomposition may be caused by contact with carbon dioxide on the surface of the crystals, leading to a low pH environment in which bleach decomposition is rapid. Consistent with this hypothesis, it has been observed that crystals produced in a laboratory from alkaline solutions were more sensitive to the presence of air when filtration was conducted in a manner to leave very little alkaline solution remaining on the crystals.

Solutions containing sodium hypochlorite are also known and described in the art. Sodium hypochlorite solutions may be prepared at temperatures below the equilibrium point at which sodium hypochlorite pentahydrate crystals will form and are maintained as a solution unless a seed crystal is present. In large-scale transportation, the complete absence of seed crystals cannot be guaranteed. When bleach solutions are chilled to temperatures at which sodium hypochlorite pentahydrate crystallizes and a seed crystal is present, the formation of crystals proceeds to create a network of needle shaped crystals that prevents the material from flowing. These crystals are not easily removed from transportation containers. Formation of sodium hypochlorite pentahydrate crystals is an obstacle to the effective and efficient transportation and distribution of sodium hypochlorite solutions at temperatures below about 10° C. Shipping at higher temperatures to avoid this crystal formation is disadvantageous because above 10° C. concentrated bleach solutions lose at least about 12% of their contained sodium hypochlorite to decomposition over a period of 30 days. Additionally, shipping low concentration bleach solutions is not economical. Transportation cost of bleach solutions having sodium hypochlorite concentrations of 15-25% is higher than the cost of transporting the reactants (50% caustic soda and liquefied chlorine gas) used to produce bleach conventionally. This higher transportation cost is due to the fact that more mass and volume must be transported per unit of sodium hypochlorite delivered.

Prior art processes, in particular, U.S. Pat. No. 5,194,238, to Olin Corporation, suggested that a slurry of sodium hypochlorite could provide a high concentration sodium hypochlorite composition with improved stability for shipping and storing. U.S. Pat. No. 5,194,238 discloses a process for producing sodium hypochlorite slurries from concentrated hypochlorous acid and sodium hydroxide. The result of this process was a slurry of sodium hypochlorite that did not require further concentration and that was produced with few impurities. Low alkalinity throughout the process was thought to minimize decomposition of sodium hypochlorite. The patent additionally teaches that a very low concentration of sodium chloride was thought to be advantageous. One key disadvantage of the process described in the patent is that the composition only remained flowable when processed continuously to keep the crystals suspended. Importantly, the compositions provided by U.S. Pat. No. 5,194,238 were not flowable when allowed to sit for a period of time. This lack of flowablity complicated handling when the compositions were shipped and when the compositions were stored for a period of time prior to use. No disclosure of reducing the size of the sodium hypochlorite crystals is made in the patent.

Therefore, what is needed is a concentrated sodium hypochlorite composition where the composition is stable over time and remains flowable without continuous processing.

SUMMARY OF THE INVENTION

Disclosed herein are compositions which comprise comminuted (i.e. reduced in size) sodium hypochlorite pentahydate crystals and processes for preparing these compositions.

In one aspect, the aqueous sodium hypochlorite compositions comprise comminuted sodium hypochlorite pentahydate crystals and at least one additional alkali salt, alkali earth metal salt, or combinations thereof. As described in more detail below, the comminuted sodium hypochlorite pentahydate crystals contribute to a reduced viscosity for the slurries and this viscosity allows the slurry to be flowable and pumpable even at high concentrations of sodium hypochlorite and over extended periods of time. The addition of the at least one additional alkali salt, alkali earth metal salt, or combinations thereof, has been unexpectedly found to prevent regrowth of the comminuted sodium chloride pentahydrate crystals and also reduces decomposition of the sodium hypochlorite in solution which provides highly stable compositions.

In another aspect, the disclosure provides a sodium hypochlorite slurry composition comprising comminuted sodium hypochlorite pentahydrate crystals with an average size of less than 2 mm in a mother liquor saturated in sodium hypochlorite. These sodium hypochlorite slurry compositions further comprise at least one additional alkali salt, alkali earth metal salt, or combinations thereof. Prior to size reduction, pentahydrate crystals grow larger in length than diameter so that length-to-diameter (L/D) ratio is typically greater than 20:1 and the length can be from 3 mm to about 5 cm long.

In still another aspect, the comminuted sodium hypochlorite pentahydrate crystals have an average size of less than about 0.5 mm and an average length-to-diameter ratio of less than about 20:1, and are in a mother liquor saturated in sodium hypochlorite and further comprising at least one additional alkali salt, alkali earth metal salt, or combinations thereof. This aqueous composition has a concentration of sodium hypochlorite between 25% and about 40% by weight, and a viscosity of less than about 100,000 cP. These highly stable, low viscosity aqueous compositions can be stored for extended periods of time, provide flowable and pumpable compositions which are easily transferred, shipped, and stored.

In another aspect, disclosed herein are processes for preparing an aqueous sodium hypochlorite slurry composition comprising milling sodium hypochlorite pentahydrate crystals for at least about 30 seconds at an RPM of at least about 1000, then adding at least one additional alkali salt, alkali earth metal salt, or combinations thereof.

Other features and iterations of the invention are described in more detail below.

DETAILED DESCRIPTION OF THE INVENTION

As previously mentioned, disclosed herein are aqueous sodium hypochlorite compositions. These compositions comprise comminuted sodium hypochlorite pentahydate crystals and at least one additional alkali salt, alkali earth metal salt, or combinations thereof. An optional base may be added to adjust the pH of the composition. These compositions are highly stable and exhibit a low viscosity.

(I) Compositions

In one aspect, the aqueous sodium hypochlorite slurry composition comprises three components; (1) sodium hypochlorite; (2) at least one sodium salt; and (3) an optional base to adjust the pH. In general, the concentration of the sodium hypochlorite present in the composition is greater than 25 weight %.

(a) Sodium Hypochlorite

In one aspect, the main component in the composition comprises high concentrations of sodium hypochlorite. Concentration of sodium hypochlorite, as used herein, refers to the total concentration of sodium hypochlorite in the aqueous solution. This concentration of sodium hypochlorite includes sodium hypochlorite solids (crystals) as well as sodium hypochlorite in solution. The overall range of sodium hypochlorite concentration may vary, but is preferably above about 25 wt %. Generally, the sodium hypochlorite compositions may range from 20 wt % to about 45 wt % by weight of the total composition. In various embodiments, the weight percent of sodium hypochlorite may range from 20 wt % to about 45 wt %, from 25 wt % to about 40 wt %, from 28 wt % to about 38 wt %, from 30 wt % to about 35 wt %, or from 32 wt % to about 34 wt % based on the total weight of the composition. With no liquid phase present, the highest theoretical concentration for pure sodium hypochlorite pentahydrate crystals is 45.26% by weight. In preferred embodiments, the mother liquor comprises about 42 wt % by weight of sodium hypochlorite which is the highest conceivable concentration.

The compositions comprise a slurry containing sodium hypochlorite pentahydrate crystals in an aqueous mother liquor. The aqueous mother liquor is generally saturated in sodium hypochlorite so that the equilibrium exchange of sodium hypochlorite between the crystals and the mother liquor is substantially slowed.

The sodium hypochlorite pentahydrate crystals may be comminuted (i.e., reduced in size). Generally, the crystal size of the sodium hypochlorite pentahydrate in the compositions may range from 0.1 mm and less than about 3 mm. The average crystal size (longest dimension) for the plurality of sodium hypochlorite pentahydrate crystals may be less than 1 mm or less than 0.5 mm. In various embodiments, the average size of the plurality of comminuted sodium hypochlorite pentahydrate crystals may be less than 1 mm, less than 0.9 mm, less than 0.8 mm, less than 0.7 mm, less than 0.6 mm, less than 0.5 mm, less than 0.4 mm, less than 0.3 mm, less than 0.2 mm, or less than 0.1 mm. In exemplary embodiments, the average crystal size of the sodium hypochlorite pentahydrate in the composition may be less than 2 mm.

The crystal size may also be described in terms of average length-to-diameter (L/D) ratio for the plurality of crystals. Generally, the average length-to-diameter (L/D) ratio may range from 20:1 to about 1:1. In various embodiments, the average length-to-diameter (L/D) ratio may range from 20:1 to about 1:1, from 18:1 to about 3:1, from 15:1 to about 5:1, from 12:1 to about 8:1, for from 11:1 to about 9:1. In preferred embodiments, the average length-to-diameter (L/D) ratio may range from 6:1 to about 2:1.

(b) At Least One Additional Alkali Salt, Alkali Earth Metal Salt, or Combinations Thereof The compositions may comprise at least one additional alkali salt, alkali earth metal salt, or combinations thereof. The prior art suggests that decomposition of sodium hypochlorite bleach compositions is minimized by the absence of sodium chloride. Yet, the inventors have unexpectedly found that the presence of at least one additional alkali salt, alkali earth metal salt, or combinations thereof in the aqueous mother liquor stabilizes the sodium hypochlorite, preventing the sodium hypochlorite from decomposing. The presence of the at least one additional alkali salt, alkali earth metal salt, or combinations thereof may also extend the temperature range within which the slurry can be satisfactorily handled by pumping or other conventional means by preventing regrowth of the comminuted sodium hypochlorite pentahydrate crystals.

Generally, the at least one additional salt may be an alkali or alkali earth metal salt. In an embodiment, the alkali or alkali metal salts may be an inorganic salt. In a preferred embodiment, the alkali or alkali earth metal salt may be a sodium salt. Non-limiting examples of the at least one sodium salt may be sodium chloride, sodium fluoride, sodium chlorate, sodium perchlorate, sodium chromate, sodium permanganate, sodium nitrate, sodium carbonate, sodium sulfate, sodium molybdate, sodium tetraborate, sodium phosphate, sodium metasilicate, or combinations thereof. In a preferred embodiment, the sodium salt is sodium chloride.

Generally, the overall salt content of the aqueous compositions may range from 1% and about 10% by weight based on the total composition, depending on the quantity of the sodium hypochlorite pentahydrate crystals. The by weight measurement is made with respect to the sodium salt as a whole and does not refer to sodium ions alone. In various embodiments, the amount of sodium salt making up the at least one additional sodium salt may range from 1% and about 10%, from 2% to about 9%, from 3% to about 8%, or from 4% to about 6% by weight of the total composition. In preferred embodiments, the amount of sodium salt may range from 3% to about 8%, or from 1.4% to about 6.2% by weight of the total composition.

At higher concentrations of salt, some salt may be present in solid form, depending on the temperature of the mixture. As the mixture is warmed, some of the hypochlorite crystals will go into solution, but salt crystals will precipitate out. Conversely, salt crystals will dissolve as the aqueous mixture is cooled. Optimally, the composition need not contain more salt than will remain in the aqueous solution over the anticipated storage temperature range of the composition. Precipitation of salt crystals from the slurry is undesirable because salt is denser and will tend to settle. In some other embodiments, the mother liquor may contain an agent to depress the freezing point of the mother liquor. In some other embodiments, the mother liquor may contain an agent to prevent regrowth of the crystals.

(c) Excess Alkalinity

In some embodiments, the mother liquor has an excess alkalinity which may provide, among other things, greater resistance to carbonic acidification from atmospheric carbon dioxide absorption. Without wishing to be bound by theory, sodium hypochlorite solutions have a "natural" pH of about 9.0, because of their tendency to dissociate into hypochlorous acid (a weak acid) and sodium hydroxide (a strong base). "Excess alkalinity" thus refers to a substance that is a stronger base than hypochlorite ion and will maintain pH of the solution above about 11. In some embodiments, the alkalizing agent (base) may be added to raise the pH of the solution to a range between 11 and 14. Typically, alkali or excess alkalinity is provided by at least one base present as a reagent in excess or added to the composition after initial reaction. Non-limiting examples of suitable bases may include lime (CaO), slacked lime (Ca(OH)$_2$), soda (washing soda, sodium carbonate, Na$_2$CO$_3$), caustic soda (lye, sodium hydroxide, NaOH), sodium metasilicate, and borax (sodium tetraborate, Na$_2$B$_4$O$_7$). In a preferred embodiment, the at least one base may be sodium hydroxide, sodium carbonate, or a combination thereof.

Generally, the amount of alkalizing agent (base) in the composition can and will vary. In some embodiments, no additional base is needed since the pH is in the range from 11 to 14. In other embodiments, the pH range of the composition may need to be raised. In these cases, the addition of base may be added from 0.01% to about 3% by weight of the total composition. As noted above, the by weight determination refers to the alkalizing agent (base) as a whole, and not just the alkali ion present.

Generally, the amount of base that may be added may range from 0.01 wt % to about 3 wt %. In various embodiments, the amount of base that may be added may range from 0.01 wt % to about 3 wt %, from about 0.05 wt % to about 2.5 wt %, from 0.1 wt % to about 2.0 wt %, from about 0.5 wt % to about 1.5 wt %, from 0.75 wt % to about 1.25 wt % m or from 0.9 wt % to about 1.1 wt % based on the total composition.

(d) Diluent

In some embodiments, the composition may comprise a diluent. The diluent may be used to adjust the concentration of the composition to the desired concentration of sodium hypochlorite pentahydrate crystals. Non-limiting examples of suitable diluents may be weak bleach, water, or combinations thereof. Weak bleach, as used herein, is a bleach solution with a concentration of about 1% to about 5% sodium hypochlorite. Generally, the amount of diluent in the composition can and will vary depending on the final concentration of the aqueous sodium hypochlorite composition needed. In various embodiments, the concentration of the aqueous sodium hypochlorite composition may range from 25 wt % to about 45 wt %, based on the total weight of the composition. The skilled artisan would clearly know the amount of diluent needed for a specific concentration of the aqueous sodium hypochlorite composition.

(e) Properties

The sodium hypochlorite pentahydrate crystals and the compositions described herein exhibit superior stability. As used herein, "stability" refers to the ability to sustain manufactured characteristics over time during shipping, storage, handling, and the like. As an example, the size of the comminuted sodium hypochlorite crystal in the composition may have an average L/D preferably below 20:1 when the composition is stored for 30, 40, 50, or 60 days or longer. In various embodiments, the sodium hypochlorite composition is stable over a period of time of at least 30 days without losing more than 5% of its contained chlorine value. In some embodiments, the slurry composition can be stored for at least about 45 days, at least about 60 days, at least about 75 days, at least about 90 days, or longer without losing 5% of its contained chlorine value.

The stability of the compositions depends, in part, on the temperature at which these compositions are stored. Generally, lower temperatures lead to less decomposition. On the other hand, the solids content of the slurry of a given total hypochlorite assay increases as the temperature decrease, making the slurry more viscous and more difficult to transfer from one container to another. Lower storage temperatures decrease the concentration of hypochlorite in the mother liquor and decrease the rate of crystal regrowth. A practical lower limit for the storage temperature is the temperature at which the mother liquor freezes. For example, the mother liquor containing sodium chloride freezes at about −18° C. Generally, the composition may be stored at between about −15° C. and about 10° C. In various embodiments, the composition may be stored at a temperature between about −15° C. and about −10° C., about −10° C. and about −5° C., about −5° C. and about 0° C., about 0° C. and about 5° C., about 5° C. and about 10° C., or about 10° C. and about 15°

C. In exemplary embodiments, the composition may be stored at a temperature between about −10° C. and about 5° C.

The stable compositions may be pumpable and flowable over a wide range of conditions. Generally, the viscosity of the compositions may range from 1,850 cP to about 100,000 cP. In various embodiments, the viscosity of the composition may range from 1,850 cP to about 100,000 cP, from 2,000 cP to about 90,000 cP, from 5,000 cP to about 75,000 cP, from 10,000 cP to about 60,000 cP, from 20,000 cP to about 50,000 cP, from 25,000 cP to about 40,000 cP, or from 30,000 cP to about 35,000 cP.

The compositions also maintain their flowable and pumpable characteristics over time. Thus, the viscosity of the compositions remains low over a variety of temperatures and conditions including standing conditions or conditions where the slurries are not mixed. The compositions described herein may remain flowable over 30 days, 60 days, 90 days or longer. In this regard, it is noted that the compositions described herein do not maintain an angle of repose greater than about 10% when standing. In various embodiments, the slurry maintains an angle of repose not more than about 10%, not more than about 9%, not more than about 8%, not more than about 7%, not more than about 6%, not more than about 5%, not more than about 4%, not more than about 3%, not more than about 2%, or not more than about 1% when standing.

(f) Preferred Embodiments

In preferred embodiments, the present disclosure provides an aqueous sodium hypochlorite slurry composition, comprising comminuted sodium hypochlorite pentahydrate crystals with an average length-to-diameter ratio less than about 20:1, and a mother liquor saturated in sodium hypochlorite. The total composition comprises between about 25% and about 40% by weight sodium hypochlorite, between about 3% and about 8% by weight sodium chloride, and between about 0.1% and about 1.1% by weight sodium hydroxide.

In another preferred embodiment, the present disclosure provides an aqueous composition comprising a plurality of comminuted sodium hypochlorite pentahydrate crystals having an average length less than about 0.5 mm and an average length-to-diameter ratio of less than about 20:1.

(II) Processes for Preparing Sodium Hypochlorite Slurry Compositions

The present disclosure also provides processes for making the aqueous sodium hypochlorite slurry compositions. The processes comprise (a) comminuting sodium pentahydrate crystals whereby subjecting blocks of crystallized sodium hypochlorite pentahydrate to mechanical crushing, milling, or abrasion wherein a slurry may be produced; (b) the addition of at least one alkali salt, alkali earth metal salt, or combinations thereof; (c) addition of a diluent; and (d) an optional alkalizing agent (base).

In one embodiment, the comminuting step involves milling with a laboratory mill, for example, a laboratory mill having titanium blades. Generally, the sodium hypochlorite pentahydrate crystals are added and milled for at least about 30 seconds at a speed of at least about 1000 rpm. In other embodiments, the mill may be operated at a speed of at least about 1100 rpm, or at least about 1200 rpm, or at least about 1300 rpm, or at least about 1400 rpm, or at least about 1500 rpm, or at least about 1600 rpm, or at least about 1700 rpm, or at least about 1800 rpm, or at least about 1900 rpm, or at least about 2000 rpm, or at least about 2100 rpm, or at least about 2200 rpm, or at least about 2300 rpm, or at least about 2400 rpm, or at least about 2500 rpm, or at least about 2600 rpm, or at least about 2700 rpm, or at least about 2800 rpm, or at least about 2900 rpm, or at least about 3000 rpm. Milling may be conducted over at least about 30 seconds, at least about 60 seconds, at least about 90 seconds, at least about 120 seconds, at least about 180 seconds, at least about 240 seconds, at least about 300 second, or at least about 360 seconds. It has been found that higher mixing intensity (by use of larger diameter blades or by higher speeds of rotation) achieves similar comminution results on the same volume of slurry in a shorter period of time.

Without wishing to be bound by theory, the predominant effect of comminution is to break crystals lengthwise, with no measurable impact on diameter. With longer comminution or more mechanical intensity, the L/D ratio may be reduced. The advantage of an L/D less than about 6:1 is that crystals make a lower viscosity mixture containing a higher proportion of solids (crystals). In general, the higher the portion of crystals, the stronger the hypochlorite content of the overall slurry. When comminution and crystallization steps are integrated in some embodiments, crystals may continue to grow in diameter while the L/D ratio remains low. In this case, larger overall crystal size (length of 2-5 mm) has no apparent disadvantage, either in viscosity or potential solids concentration. In general, the comminution energy required to achieve a desired L/D is smaller when the overall crystal size is larger.

In some embodiments, the milling, grinding, or crushing may be conducted until the sodium hypochlorite pentahydrate crystals reach a given size. In some embodiments, the longest dimension of the comminuted sodium hypochlorite pentahydrate crystals may be less than about 1 mm, less than about 0.5 mm, or less than about 0.1 mm. In one embodiment, the average length-to-diameter ratio of the comminuted sodium hypochlorite pentahydrate crystals is less than about 20:1, such as less than about 6:1. While the salt is present in mother liquor during comminution (wet milling), alkalizing agent (base) may be added prior to this step or afterward. If an additional ingredient reduces the rate of crystal growth, it may be added to the mother liquor at any convenient time. If added to the crystallizer, the additional ingredient may reduce the average crystal size.

In one embodiment, the process further comprises diluting the comminuted sodium hypochlorite pentahydrate crystals. Non-limiting examples of suitable diluents may be weak bleach, water, or combinations thereof. Weak bleach, as used herein, is a bleach solution with a concentration of about 1% to about 5% sodium hypochlorite. Generally, the amount of diluent used in the composition will depend on the final concentration of the aqueous sodium hypochlorite composition needed. In various embodiments, the concentration of the aqueous sodium hypochlorite composition may range from 25 wt % to about 45 wt %, based on the total weight of the composition Alternatively, or in addition to the above, the crystallization formation conditions may be controlled to produce a desired crystal size and shape without mechanical processing of the crystals.

In one embodiment, the process further comprises the addition of at least one alkali salt, alkali earth metal salt, or combinations thereof. Suitable examples of the at least one one alkali salt, alkali earth metal salt, or combinations thereof, are described above.

In another embodiment, the process further comprises the addition of an optional alkalizing agent (base). This alkalizing agent would be used to raise the pH of the composition in the range of pH 11-14, if needed.

In one embodiment of the process for controlling the length-to-diameter ratio of crystals, a stream may be fed through an in-line comminution device. A heat exchanger may be used to removes heat from the milling step. The exchanger reduces the temperature to below the saturation point prior to reintroduction to the crystallizer. This circulation may be controlled by a pump, such as a positive-displacement pump. In this way, comminution and crystallization steps are integrated into a single process.

With the properties of the composition described above, the aqueous slurry composition retains a number of advantages. Since the compositions remain pumpable and flowable over time, this property allows these compositions to be pumped directly into shipping containers without needing significant agitation prior to pumping. Also, when the compositions are transferred out of the containers, less sodium hypochlorite pentahydrate is left on the walls of the shipping container. With knowledge of the stability of these compositions, the compositions may be transported at a temperature of between about −15° C. and about 10° C., such as between about −10° C. and about 5° C. The composition is provided in an insulated container designed to maintain an average temperature of about 0° C. to about 5° C. The aqueous sodium hypochlorite slurry may be shipped in any container currently used to ship liquid sodium hypochlorite bleach. Some of these containers comprise suitable materials of construction and meet the guidelines for regulatory compliance. For containers loaded and unloaded within a few hours, insulation may be optional and refrigeration may not be needed. For containers loaded and unloaded over a period of days, weeks or longer, insulation may be preferred and may be cooled with a refrigeration unit.

These compositions may be used to prepare dilute aqueous solutions of sodium hypochlorite. In this case, the compositions may be diluted with a diluent wherein the diluent may be dilute bleach or water to obtain a concentration below 10% of sodium hypochlorite. In various embodiments, the concentration of the diluted sodium hypochlorite may be diluted to a concentration of less than 10%, of less than 9%, of less than 8%, of less than 7%, of less than 6%, of less than 5%, of less than 4%, of less than 3%, less than 2%, or less than 1%. The method of dilution may also comprise agitation of the dilute solution. Dissolution of the sodium hypochlorite pentahydrate crystals is endothermic, so either the diluent or the diluted product may be optionally heated to obtain a desired final temperature of the sodium hypochlorite solution.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The term "flowable" refers to the ability of a composition to have some of the characteristics of liquid movement.

The term "pumpable" is related to the liquid movement and means that the composition may be moved by commercial pumps.

The term "alkalizing agent" refers to a base that is capable of raising the pH of the slurry composition to a pH range of 11 to 14.

The term "stability" refers to the ability to sustain manufactured characteristics over time during shipping, storage, handling, and the like.

Having described the invention in detail, it will be apparent that modifications and variations are possible without departing from the scope of the invention defined in the appended claims.

EXAMPLES

The following examples illustrate various embodiments of the invention.

pH (excess alkalinity) of the composition was determined by first reacting the composition with hydrogen peroxide to convert hypochlorite ion in solution into chloride and oxygen, and was then titrated to a neutral pH with a diluted acid reagent. When bases with multiple protonated states, such as carbonate, were used, the excess alkalinity was measured using the first breakpoint in the titration curve. So, for example, with sodium carbonate the breakpoint associated with conversion of all carbonate ions to bicarbonate (about pH 9) measures the pH for stabilizing bleach.

Contained chlorine was determined by titrating a representative sample of the slurry with a standard sodium thiosulfate solution. The sample was treated with excess potassium iodide then buffered with glacial acetic acid and the liberated iodine was titrated with sodium thiosulfate.

Example 1

Preparation of Sodium Hypochlorite Pentahydrate Crystals

The following method was used to prepare all samples of sodium hypochlorite pentahydrate crystals. A sodium hypochlorite solution was made by chlorinating caustic soda and precipitating sodium chloride. After filtering the sodium chloride, a solution containing approximately 30.5% sodium hypochlorite, 7.1% sodium chloride, and 0.5% sodium hydroxide was obtained at 25° C. This solution can be described as chlorinated caustic filtrate ("CCF"). The CCF was diluted to approximately 28% and chilled to −5° C. with no crystals forming, then seeded with pentahydrate crystals. On seeding, acicular (long needle-shaped pentahydrate crystals) formed rapidly. These crystals were filtered and analyzed, the results being provided in Table I. After filtration, the cake appeared to be dry, but actually still contained mother liquor, as shown by the salt concentration in the analysis.

TABLE 1

| Batch # | CCF (% NaOCl) | Dilution (% NaOCl) | % NaOCl Crystals | % NaCl | % NaOH | % $Na_2CO_3$ | % Yield Crystals |
|---|---|---|---|---|---|---|---|
| 1A | 30.04 | 27.87 | 40.23 | 2.75 | 0.44 | 0.053 | 52.8 |
| 1B | 30.04 | 27.87 | 40.38 | 2.89 | 0.47 | 0.054 | — |
| 2A | 29.59 | 28.23 | 39.33 | 3.38 | 0.54 | 0.083 | 52.7 |
| 2B | 29.59 | 28.23 | 39.46 | 2.21 | 0.49 | 0.063 | 52.8 |
| 3A | 30.66 | 27.98 | 38.73 | 3.95 | 0.57 | 0.069 | — |
| 3B | 30.66 | 27.98 | 36.69 | 3.63 | 1.01 | 0.044 | — |

Representative samples of the slurry must be used such that the percentage of solids/liquid in the sample analyzed is identical. The product is well mixed before sampling, the sample is large enough to reduce the impact of a few crystals on the result outcome, and the opening or area of the sampling device is large compared to the size of the crystals. Over the past few months, we have increased the sample size from the 5-gram samples analyzed directly to 100 gram samples that dissolved in 1 L water and then an aliquot taken from the dissolved sample volume. The titration methods used are standard for the chlor alkali industry and are well recognized by skilled artisan.

Example 2

Preparation Sodium Hypochlorite Slurries

Sodium pentahydrate compositions were prepared from the crystals of Example 1, which was first reanalyzed for hypochlorite (39.51 wt %), and salt (3.45 wt %). No excess alkalinity was found. Each composition was subjected to crushing with a chilled mortar and pestle until no there was no further noticeable change in the subjectively observed viscosity. Slurries were stored in a $CaCl_2$ bath set to −5° C. for the first six weeks of the study. After first six weeks, the temperature of the bath was adjusted approximately every 24 hours in order to observe the effect of temperature on the viscosity of the slurries. Once viscosity studies were completed, slurries were again maintained at −5° C. These samples analyzed by the methods described above.

TABLE 2

| Sample | Pentahydrate Crystals | NaOH | DI $H_2O$ | Added NaCl | Theoretical NaOCl | Actual NaOCl |
|---|---|---|---|---|---|---|
| Slurry 1 | 84.81% of 39.99% NaOCl | 0.15% | 15.74% | 0% | 33.92% | 33.41% |
| Slurry 2 | 80.85% of 39.99% NaOCl | 0.14% | 17.98% | 1.03% | 32.33% | 30.35% |
| Slurry 3 | 81.02% of 40.00% NaOCl | 0.15% | 16.65% | 2.17% | 32.41% | 32.17% |
| Slurry 4 | 79.60% of 40.00% NaOCl | 0.15% | 17.05% | 3.20% | 31.84% | 31.12% |
| Slurry 5 | 79.46% of 39.94% NaOCl | 0.15% | 16.13% | 4.25% | 31.74% | 30.46% |

To sample the compositions, the tapered end of a 5-mL pipet tip was cut off to create a capillary tube, which was pushed straight down into the slurry and removed with the other opening covered with a thumb or finger in order to keep the sampled slurry from falling back into the beaker. The slurry in the pipet tip was transferred to a tared 50-mL centrifuge tube, and the weight of the sampled slurry was recorded. The centrifuge tube was tared again, and deionized water added to dilute the slurry was recorded. The dilution factor was then calculated and used as an appropriate multiplier after each titration. Analyses for NaOCl, NaCl, NaOH, and $Na_2CO_3$ were performed using methods typically used for analyzing sodium hypochlorite solutions that were adjusted for the concentrations of the example composition (NaOCl), (NaCl), and (NaOH and $Na_2CO_3$). Slurries were tested weekly for NaOCl and NaCl and at the beginning and end of the study for NaOH and $Na_2CO_3$. The fraction of solids was also obtained by measuring the heights of the solid and liquid layers of the compositions.

During the first six weeks, the compositions were kept at −5° C. and tested weekly for the concentration of NaOCl and "free" NaCl. The results shown in Table 3 indicate only minor changes in NaOCl concentration and NaCl concentration over time.

TABLE 3

| Date | Temp (° C.) | % Solids | % NaOCl | % NaCl | % NaOH | % $Na_2CO_3$ |
|---|---|---|---|---|---|---|
| Slurry 1 | | | | | | |
| Day 1 | −5.0 | 79 | 33.41* | 1.56* | 0.24 | 0.25 |
| Day 2 | −5.0 | 83 | — | — | — | — |
| Day 4 | −5.0 | — | — | — | — | — |
| Day 5 | −5.0 | 83 | 32.79 | 1.71 | — | — |
| Day 19 | −5.0 | 87 | 31.67 | 1.76 | — | — |
| Day 26 | −5.0 | 76 | 32.86 | 1.61 | — | — |
| Day 28 | −5.0 | — | — | — | — | — |
| Day 29 | −5.0 | — | — | — | — | — |
| Day 32 | −5.0 | 86 | 32.64 | 1.65 | — | — |
| Day 40 | −5.0 | 89 | 32.48 | 1.76 | — | — |
| Day 47 | −8.5 | 85 | 33.13 | — | — | — |
| Day 53 | −5.0 | 77 | 33.81 | 1.61 | — | — |
| Day 55 | −5.0 | 86 | 31.76 | 1.86 | 0.12 | 0.46 |
| Slurry 2 | | | | | | |
| Day 1 | −5.0 | 82 | 30.35* | 2.95* | 0.39 | 0.21 |
| Day 2 | −5.0 | 78 | — | — | — | — |
| Day 4 | −5.0 | — | — | — | — | — |
| Day 5 | −5.0 | 76 | 29.98 | 3.10 | — | — |
| Day 19 | −5.0 | 78 | 30.25 | 2.79 | — | — |
| Day 26 | −5.0 | 78** | 29.23 | 3.16 | — | — |
| Day 28 | −5.0 | — | — | — | — | — |
| Day 29 | −5.0 | — | — | — | — | — |
| Day 32 | −5.0 | 77 | 30.54 | 2.88 | — | — |
| Day 40 | −5.0 | 75 | 30.73 | 2.89 | — | — |
| Day 47 | −8.5 | 78 | 28.93** | — | — | — |
| Day 53 | −5.0 | 70 | 29.43 | 3.16 | — | — |
| Day 55 | −5.0 | 83 | 29.58 | 3.00 | 0.34 | 0.27 |
| Slurry 3 | | | | | | |
| Day 1 | −5.0 | — | — | — | — | — |
| Day 2 | −5.0 | — | — | — | — | — |
| Day 4 | −5.0 | 79 | 32.17* | 3.41* | 0.20 | 0.25 |
| Day 5 | −5.0 | 82 | 31.71 | 3.50 | 0.22 | 0.23 |
| Day 19 | −5.0 | 78 | 31.05 | 3.64 | — | — |
| Day 26 | −5.0 | 83 | 31.76 | 3.40 | — | — |
| Day 28 | −5.0 | — | — | — | — | — |
| Day 29 | −5.0 | — | — | — | — | — |
| Day 32 | −5.0 | 78 | 31.79 | 3.41 | — | — |
| Day 40 | −5.0 | 77 | 31.98 | 3.62 | — | — |
| Day 47 | −8.5 | 83 | 32.04 | — | — | — |
| Day 53 | −5.0 | 72 | 30.11 | 3.76 | — | — |
| Day 55 | −5.0 | 86 | 31.83 | 3.40 | 0.15 | 0.33 |
| Slurry 4 | | | | | | |
| Day 1 | −5.0 | — | — | — | — | — |
| Day 2 | −5.0 | — | — | — | — | — |
| Day 4 | −5.0 | 80 | 31.12* | 4.47* | 0.26 | 0.19 |
| Day 5 | −5.0 | 79 | 30.71 | 4.63 | 0.27 | 0.21 |
| Day 19 | −5.0 | 72 | 30.42 | 4.68 | — | — |
| Day 26 | −5.0 | — | — | — | — | — |
| Day 28 | −5.0 | 70 | 29.98 | 4.67 | — | — |
| Day 29 | −5.0 | — | — | — | — | — |
| Day 32 | −5.0 | 77 | 30.57 | 4.54 | — | — |
| Day 40 | −5.0 | 75 | 30.39 | 4.49 | — | — |
| Day 47 | −8.5 | 78 | 30.21 | — | — | — |
| Day 53 | −5.0 | 68 | 30.26 | 4.63 | — | — |
| Day 55 | −5.0 | 84 | 30.52 | 4.54 | 0.15 | 0.30 |
| Slurry 5 | | | | | | |
| Day 1 | −5.0 | — | — | — | — | — |
| Day 2 | −5.0 | — | — | — | — | — |
| Day 4 | −5.0 | — | — | — | — | — |
| Day 5 | −5.0 | — | — | — | — | — |
| Day 19 | −5.0 | — | — | — | — | — |
| Day 26 | −5.0 | — | — | — | — | — |
| Day 28 | −5.0 | — | — | — | — | — |
| Day 29 | −5.0 | 80 | 30.46 | 6.13 | 0.20 | 0.35 |
| Day 32 | −5.0 | — | — | — | — | — |
| Day 40 | −5.0 | 83 | 31.00 | 5.86 | — | — |
| Day 47 | −8.5 | 87 | 30.62 | — | — | — |
| Day 53 | −5.0 | 78 | 31.11 | 5.78 | — | — |
| Day 55 | −5.0 | 89 | 30.32 | 6.32 | 0.19 | 0.37 |

The five slurries had the following ranges as shown in Table 4.

TABLE 4

| Sample | wt % NaOCl | wt % NaCl |
|---|---|---|
| Slurry 1 | 31.67-33.41% | 1.56-1.76% |
| Slurry 2 | 29.23-30.73% | 2.79-3.16% |
| Slurry 3 | 31.05-32.17% | 3.41-3.64% |
| Slurry 4 | 29.98-31.12% | 4.47-4.68% |
| Slurry 5 | 30.46-31.00% | 5.86-6.13% |

It is notable that these ranges do not imply a trend. Numbers obtained for concentrations of NaOCl and NaCl appeared to change with each round of analysis and with no apparent trend. The sampling method employed, although largely effective, may have resulted in some inconsistency of sampling and thus more measurement error. Taking a much larger sample, dissolving it and then analyzing an aliquot has measurably reduced the variation in analytical results. Reducing particle size is also a practical approach to reducing sampling errors. As a result, changes observed may not be solely due to physical or chemical changes in the slurries, but due to sampling method. The fraction of solids was also measured as percent settled solids to determine if a representative sample was removed for analysis. (Theoretically, if a representative sample is removed, the percentage of solids should remain the same even if the overall volume of the slurry decreases).

During the last two weeks of storage, the samples were held at a variety of storage temperatures, ranging from −9.1° C. to +2° C. After holding the sample at a constant temperature for at least 24 hours, the fraction settled solids in the sample was observed. The sample was then stirred by hand using a pipet tip and the consistency was gauged on a subjective 1-10 scale along with visual observations.

TABLE 5

| Date | Temp (° C.) | % Solids | Ratings | Comments |
|---|---|---|---|---|
| Slurry 1 | | | | |
| Day 41 | −5 | — | 3 | — |
| Day 42 | −7 | 89 | 3 | — |
| Day 43 | −8.8 | 89 | 4 | Takes longer to slump down after stirring. Slurry sticks to slide more. Definite impressions left by stirring. |
| Day 48 | −9.1 | 89 | 5 | Takes longer to slump down after stirring - even more than before (−8.8). Slurry sticks to the sides. Definite impressions left by stirring. |
| Day 49 | −6 | 85 | 4 | Most viscous Slurry slowly slumps down after being stirred. Raising temp seems to have decreased viscosity. |
| Day 50 | −3 | 81 | 3 | Slight impressions made while stirring. Slurry slumps down after being stirred. |
| Day 53 | −5 | 81 | 3 | Settled quickly, some impressions made while stirring. |
| Day 54 (A.M.) | 0 | 74 | 2 | Settled quickly, stirring impressions do not last. |
| Day 54 (P.M.) | 2 | 73 | 1.5 | Nothing to break up at first - no real resistance. Feel some solids. |
| Slurry 2 | | | | |
| Day 41 | −5 | — | 1 | — |
| Day 42 | −7 | 80 | 2 | — |
| Day 43 | −8.8 | 75 | 3 | Less viscous than slurry 1. Slight impressions made while stirring but slurry slumps down afterwards. |
| Day 48 | −9.1 | 75 | 3 | Less viscous than slurry 1. Slight impressions made while stirring but slurry slumps down afterwards. |
| Day 49 | −6 | 75 | 2.5 | Slurry slumps down after being stirred. Impressions disappear quickly. |
| Day 50 | −3 | 75 | 2 | No impressions made while stirring. Less viscous than day before. |
| Day 53 | −5 | 75 | 2 | Not very viscous. 2 Layers possible -some fluffy crystals on top. |
| Day 54 (A.M.) | 0 | 68 | 1 | After breaking up it becomes very thin - can feel some solids |
| Day 54 (P.M.) | 2 | 68 | 0.5 | Very thin - crystals don't stick to sides of beaker. |
| Slurry 3 | | | | |
| Day 41 | −5 | — | 1 | |
| Day 42 | −7 | 79 | 2.5 | — |
| Day 43 | −8.8 | 77 | 3 | Less viscous than slurry 1. Slight impressions made while stirring but slurry slumps down afterwards. |
| Day 48 | −9.1 | 77 | 3 | Same as slurry #2 - again with slight impressions. |
| Day 49 | −6 | 80 | 2.5 | Slurry slumps down after being stirred. Impressions disappear quickly. |
| Day 50 | −3 | 76 | 2 | No impressions made while stirring. Less viscous than day before. |
| Day 53 | −5 | 80 | 2.5 | More viscous than 2 & 4. Settled quickly. |
| Day 54 (A.M.) | 0 | 66 | 1 | After breaking up it becomes very thin - can feel some solids |
| Day 54 (P.M.) | 2 | 67 | 0.5 | Very thin - crystals don't stick to sides of beaker. |
| Slurry 4 | | | | |
| Day 41 | −5 | — | 0.5 | |
| Day 42 | −7 | 78 | 2 | — |
| Day 43 | −8.8 | 75 | 2.5 | Less viscous. Easiest to stir. Slurry readily slumps down after stirring. |
| Day 48 | −9.1 | 79 | 2.5 | Less Viscous. Easiest to stir. Slurry readily slumps down after stirring. |
| Day 49 | −6 | 71 | 2.5 | Slurry slumps down after being stirred. Impressions disappear quickly. |
| Day 50 | −3 | 74 | 2 | No impressions made while stirring. Less viscous than day before. |
| Day 53 | −5 | 78 | 2 | Settled quickly - not very viscous. |
| Day 54 (A.M.) | 0 | 69 | 1 | Feels watery - little to no resistance when stirring. |
| Day 54 (P.M.) | 2 | 65 | 1 | No real resistance of beginning of stirring. |
| Slurry 5 | | | | |
| Day 41 | −5 | — | 2 | |
| Day 42 | −7 | 87 | 3 | — |
| Day 43 | −8.8 | 83 | 3.5/3 | Similar to slurry #1, but appears slight less viscous. |
| Day 48 | −9.1 | 83 | 3.5 | Similar to slurry #1, but appears slightly less viscous. |
| Day 49 | −6 | 84 | 3 | Slightly more viscous than other slurries. Slight impressions made while stirring, but slurry slumps down after being stirred. |
| Day 50 | −3 | 84 | 2.5 | Slightly more viscous than slurries 2, 3 & 4. |

TABLE 5-continued

| Date | Temp (° C.) | % Solids | Ratings | Comments |
|---|---|---|---|---|
| Day 53 | −5 | 81 | 3 | Some resistance - some solids- some impressions that disappear quickly. |
| Day 54 (A.M.) | 0 | 77 | 1.5 | More viscous than 2-4 but less than 1. More resistance to stirring than "1s". |
| Day 54 (P.M.) | 2 | 73 | 1.5 | Easy to break up -some solids. |

The results of the tests in this second example verify that the slurry's pumpable handling properties are retained even after heating and cooling cycles within the ranges specified. When the slurry's composition contained higher concentrations of NaCl, the fraction solids and the physical properties were more consistent as the sample was warmed or cooled, as also claimed. All slurry samples lost less hypochlorite strength over time than would be expected for a solution of 24 wt % hypochlorite held at temperatures above which pentahydrate crystals would precipitate. Hypochlorite strength and contained chlorine value are related by the ratio of the molecular weights of the two compounds. For example, 1 mole NaOCl has the same oxidizing power as 1 mole $Cl_2$ as measured by an iodometric titration; therefore on a weight basis, 74.44 g of NaOCl is equivalent to 70.91 g $Cl_2$, or 1.04978 g NaOCl equals 1 g $Cl_2$.

Example 3

A sample of hypochlorite solution having about 28% sodium hypochlorite, 7% sodium chloride, and 0.6% sodium hydroxide was cooled to 0° C. Formation of pentahydrate crystals was initiated by adding a few sodium hypochlorite pentahydrate crystals previously prepared. The mixture rapidly formed a network of crystals and became semi-solid. A 500 grain sample of this semi-solid mixture was added to a laboratory mill containing titanium blades approximately 3 inches in radius impelled by a central shaft at 2000 RPM. Samples were taken for inspection initially, and after 5, 10, and 20 seconds of milling. The grinding is not mill specific as there needs only be enough energy added to reduce the crystal size using good handling practices for a corrosive, strong oxidizer.

Microscopic inspection of the crystals and measurement of the L/D ratio shows that milling breaks the longest crystals, producing a pourable slurry. Samples of this slurry were also allowed to settle. Clear liquor from the samples was poured off, and the remaining pourable slurry was analyzed, demonstrating that increased concentration was now possible. A summary of the results are shown in the following table.

TABLE 6

| | Sample | | | |
|---|---|---|---|---|
| | 3A | 3B | 3C | 3D |
| Milling time seconds | 0 | 20 | 30 | 50 |
| Average Length μm | 1898 | 600 | 500 | 503 |
| Average Diameter μm | 98 | 105 | 109 | 113 |
| Average L/D ratio | 19.4 | 5.7 | 4.6 | 4.5 |
| Hypochlorite in Settled Slurry* (wt %) | 27.3 | 36.6 | 34.6 | 35.6 |

*"Settled slurry" is an analysis of a sample taken after settling and the excess liquor has been decanted. Prior to size reduction when L/D is high, the settled concentration is lower than after comminution.

Example 4

A sample of low-salt sodium hypochlorite solution was cooled and seeded to produce crystals of sodium hypochlorite pentahydrate as in Example 3 to produce a paste-like material. The initial paste was milled for 30 seconds at 2000 rpm in the same mill described in Example 3 to produce a slurry. This slurry was then filtered on a vacuum filter and the cake was then milled again for another 30 seconds. The filter cake became a thick slurry which was filtered yet again, and the resulting cake was milled again. The final slurry so prepared was analyzed and found to contain 37 wt % sodium hypochlorite and the crystals were observed to have an average length of 400 microns and an average diameter of 110 microns. This slurry was diluted with DI water to obtain slurries of a range of concentrations from 32% to 35% by weight. These slurries were placed in a Brookfield viscometer and the viscosity measured with the following results at 0.09 degrees C. No salt is added in this example.

TABLE 7

| % NaOCl | % Torque | 100/RPM | TK | SMC | (cP) Viscosity* |
|---|---|---|---|---|---|
| 35.5 | 37 | 5 | 1 | 53.5 | 9897.5 |
| 35.0 | 34 | 5 | 1 | 53.5 | 9095.0 |
| 34.5 | 27 | 5 | 1 | 53.5 | 7222.5 |
| 34.0 | 15 | 5 | 1 | 53.5 | 4012.5 |
| 33.5 | 11 | 5 | 1 | 53.5 | 2942.5 |
| 33.0 | 8 | 5 | 1 | 53.5 | 2140.0 |
| 32.5 | 7 | 5 | 1 | 53.5 | 1872.5 |

*Viscosities were tested under the following conditions: RPM setting for experiment 20, Spindle vane V-73 SMC 53.5, Viscometer model RV 1, Bath temp ° C. 0.09.

In this example, all of the slurries produced were judged to have a viscosity low enough to be pumped and handled using conventional pumps and piping normally used for bleach solutions, albeit at flow rates lower than expected for conventional bleach solutions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aqueous sodium hypochlorite slurry composition, comprising:
   comminuted sodium hypochlorite pentahydrate crystals with an average length-to-diameter ratio of less than about 20:1, in an aqueous mother liquor saturated in sodium hypochlorite and further comprising one or more additional alkali salts, wherein the additional alkali salt is selected from the group consisting of sodium fluoride, sodium chlorate, sodium perchlorate, sodium chromate, sodium permanganate, sodium nitrate, sodium sulfate, sodium molybdate, sodium tetraborate, sodium phosphate, sodium metasilicate; and mixtures thereof;
   wherein the composition comprises between 25 weight % and about 45 weight % of sodium hypochlorite;

wherein the composition comprises between 1 weight % and about 10 weight % of the at least one additional alkali-salts;

wherein the composition further comprises between 0.01 weight % and about 3 weight % of at least one base wherein the pH of the composition is between a pH of 11 to 14;

and wherein the at least one base comprises sodium hydroxide, sodium carbonate, or mixtures thereof.

2. The composition of claim 1, wherein the longest dimension of the comminuted sodium hypochlorite pentahydrate crystals is less than about 2.0 mm.

3. The composition of claim 1, having a viscosity of less than about 100,000 cP.

4. The composition of claim 1, wherein the composition is stored at a temperature of between about −15° C. and about 10° C. for at least 7 days.

5. The composition of claim 1, wherein the at least one base comprises sodium hydroxide; and the longest dimension of the comminuted sodium hypochlorite pentahydrate crystals is less than about 2.0 mm.

6. The composition of claim 1, wherein the longest dimension of the comminuted sodium hypochlorite pentahydrate crystals is less than about 2.0 mm; and the viscosity is less than about 100,000 cP.

7. The composition of claim 1, wherein the at least one base comprises sodium hydroxide.

8. The composition of claim 1, wherein the composition comprises between 1.4% to about 6.2% by weight of the at least one additional alkali salt.

9. The composition of claim 1, wherein the composition comprises between 28 weight % and about 38 weight % of sodium hypochlorite.

10. The composition of claim 1, wherein the additional alkali salt is selected from the group consisting of sodium fluoride, sodium chlorate, sodium perchlorate, sodium chromate, sodium permanganate, sodium nitrate, sodium sulfate, sodium molybdate, sodium phosphate, and mixtures thereof.

11. An aqueous sodium hypochlorite slurry composition, comprising:

comminuted sodium hypochlorite pentahydrate crystals with an average length-to-diameter ratio of less than about 20:1, in an aqueous mother liquor saturated in sodium hypochlorite and further comprising one or more additional alkali salts, wherein the additional alkali salt is selected from the group consisting of sodium fluoride, sodium chlorate, sodium perchlorate, sodium chromate, sodium permanganate, sodium nitrate, sodium sulfate, sodium molybdate, sodium phosphate, and mixtures thereof;

wherein the composition comprises between 25 weight % and about 45 weight % of sodium hypochlorite;

wherein the composition comprises between 1 weight % and about 10 weight % of the at least one additional alkali-salts;

wherein the composition further comprises between 0.01 weight % and about 3 weight % of at least one base comprising at least one of sodium hydroxide, sodium carbonate, sodium metasilicate, or sodium tetraborate, wherein the pH of the composition is between a pH of 11 to 14.

12. The composition of claim 11, wherein the longest dimension of the comminuted sodium hypochlorite pentahydrate crystals is less than about 2.0 mm.

13. The composition of claim 11, having a viscosity of less than about 100,000 cP.

14. The composition of claim 11, wherein the composition is stored at a temperature of between about −15° C. and about 10° C. for at least 7 days.

15. The composition of claim 11, wherein the at least one base comprises sodium hydroxide, sodium metasilicate, sodium tetraborate, or mixtures thereof; and the longest dimension of the comminuted sodium hypochlorite pentahydrate crystals is less than about 2.0 mm.

16. The composition of claim 11, wherein the longest dimension of the comminuted sodium hypochlorite pentahydrate crystals is less than about 2.0 mm; and the viscosity is less than about 100,000 cP.

17. The composition of claim 11, wherein the at least one base comprises sodium hydroxide.

18. The composition of claim 11, wherein the composition comprises between 1.4% to about 6.2% by weight of the at least one additional alkali salt.

19. The composition of claim 11, wherein the composition comprises between 28 weight % and about 38 weight % of sodium hypochlorite.

* * * * *